United States Patent [19]
Halachmi et al.

[11] Patent Number: 6,104,400
[45] Date of Patent: Aug. 15, 2000

[54] LARGE TREE STRUCTURE VISUALIZATION AND DISPLAY SYSTEM

[75] Inventors: Avi Halachmi, Rishon Letsion; Michal Jacovi, Rafet; Menachem Shtalhaim, Haifa; Sigalit Ur, D.N. Misgav; Yoelle Maarek, Haifa, all of Israel

[73] Assignee: International Business Machines Corporation, Armonk, N.Y.

[21] Appl. No.: 09/123,606

[22] Filed: Jul. 28, 1998

[30] Foreign Application Priority Data

Dec. 30, 1997 [EP] European Pat. Off. .............. 97480105

[51] Int. Cl.$^7$ ...................................................... G06F 3/14
[52] U.S. Cl. ........................... 345/356; 345/353; 345/357; 345/341
[58] Field of Search ..................................... 345/356, 357, 345/353, 352, 341, 342, 340, 973, 146, 902

[56] References Cited

U.S. PATENT DOCUMENTS

| | | | |
|---|---|---|---|
| 5,295,243 | 3/1994 | Robertson et al. ................. | 345/353 X |
| 5,392,388 | 2/1995 | Gibson ................................. | 345/341 X |
| 5,559,527 | 9/1996 | Quinn ................................... | 345/902 X |
| 5,596,699 | 1/1997 | Driskell ................................. | 345/352 |
| 5,619,632 | 4/1997 | Lamping et al. .................... | 345/356 X |
| 5,706,448 | 1/1998 | Bladles ................................. | 345/352 X |
| 5,721,853 | 2/1998 | Smith ................................... | 345/353 |
| 5,745,717 | 4/1998 | Vayda et al. .......................... | 345/352 |
| 5,828,360 | 10/1998 | Anderson et al. ................... | 345/352 X |
| 5,940,076 | 8/1999 | Sommers et al. .................... | 345/352 X |

*Primary Examiner*—Raymond J. Bayerl
*Attorney, Agent, or Firm*—Edward H. Duffield

[57] ABSTRACT

System for the visualization of a large tree structure in which the selection of a center object (40) amongst the objects of the large tree structure enables n levels of descendants from the center object to be visualized on a screen together with the center object, the system has a visualization control in computer memory enabling the objects of a given level corresponding to the children of a parent object of the immediate higher level to be visualized in a fan-shaped area centered around the parent object. A scrollbar associated with the parent object enables all the children of a parent object to be scrolled in a fan. Fan control buttons on the screen enable the aperture of the fans to be modified so that a variable number of children can be visualized in each fan.

13 Claims, 5 Drawing Sheets

LARGE TREE STRUCTURE VISUALIZATION AND DISPLAY SYSTEM

TECHNICAL FIELD OF THE INVENTION

The invention relates to the advanced visualization models for large logic tree structures applicable to many fields related to computer-human interaction. These fields include the software environment or the world wide web, and in particular, a fan-shaped visualization system for displaying dynamically large tree structures on a screen.

BACKGROUND

Large organizational tree structures often cannot be easily visualized by means of regular graphical tree layouts because the graph soon becomes too large due to the overloading of information on the screen. Indeed, displaying just a few hundred edges on a regular screen window makes the picture unreadable.

Multiple solutions have been proposed in the past that enabled a user to see only portions of a graph (via a zoom in window for instance) such as the hyperbolic tree model from Xerox (registered trademark), or even drastically different models such as the University of MarylandAEs tree maps by Johnson and Shneiderman. These solutions only bring partial answers either because they are difficult to interact with (the zoom in window can be difficult to position on a portion of graph with a very large branching factor), to visualize (while extremely intuitive, the hyperbolic scheme raises the same problem as the zoom), or are simply difficult to understand for the user insofar as the tree map view requires a significant amount of learning time as explained by the authors themselves.

Pragmatically, the standard tree-control view familiar to Personal Computer (PC) users, for example the Windows (registered trademark) 95/NT (registered trademark) Explorer and multiple applications on Windows (Registered trademark), in which the tree is represented as a hierarchy of folders is the most widespread and the most intuitive as it can support arbitrarily long lists of descendants for any node, via the scrollbar mechanism of the window. However, such a system is basically line-based and not graphical and also lacks aesthetic quality. More graphical layouts in which siblings are on a same axis and connected to their direct parent by a straight line do not scale up.

OBJECTS OF THE INVENTION

Accordingly, the primary object of the invention is to represent graphical trees with an arbitrary large branching factor on a screen while keeping the visualization readable and intuitive enough to be understood and easily used by the users.

Another object of the invention is to provide a visualization system wherein only a restricted amount of information is displayed on the screen and in which the user can dynamically control the number of direct descendants of each displayed child.

Another object of the invention is to provide a visualization system enabling the graphical representation of a large tree and navigation within it by means of a fan metaphor, allowing the user to interactively open or close the span of descendants of every object, and thus to show more or less information.

BRIEF SUMMARY OF INVENTION

The invention relates therefore to a system for the visualization of a large tree structure comprising a processing unit (10), a storage (14), a display screen (32) and a mouse (26) for positioning a cursor on said screen, in which the selection of a center object amongst the objects of the large tree structure under the control of the processing unit enables n levels of descendants from the center object to be visualized on the screen together with the center object; such a system being characterized in that it comprises visualization control means in computer memory enabling the objects of a given level corresponding to the children of a parent object of the immediate higher level to be visualized in a fan-shaped area centered around the parent object, and a scrollbar associated with this parent object enabling all the children thereof to be scrolled in said fan.

According to an important aspect of the invention, the system comprises fan display area control means in computer memory enabling the aperture of the fan-shaped display area centered around the parent object to be modified so that a variable number of children thereof can be visualized in said fan area.

According to another feature of the invention, the visualization control means comprise for the center object and for each object of at least the n-1 first levels of descendants considered as a parent object, —a buffer for storing the addresses of the M children of the parent object, —a location defining the aperture angle of a fan within which a subset of m children is displayed ($m \leq M$), the addresses of these ones being consecutive in the buffer, and—first and second pointers for pointing to respective addresses in the buffer of the first and last children of the subset, the value of the pointers being determined by the value of the aperture angle of the fan-shaped area.

BRIEF DESCRIPTION OF THE DRAWINGS

These and other features, objects and advantages of the invention will become clear upon a consideration of the following detailed description of the invention when read in conjunction with the drawings in which.

BRIEF DESCRIPTION OF THE INVENTION

Figure 1:
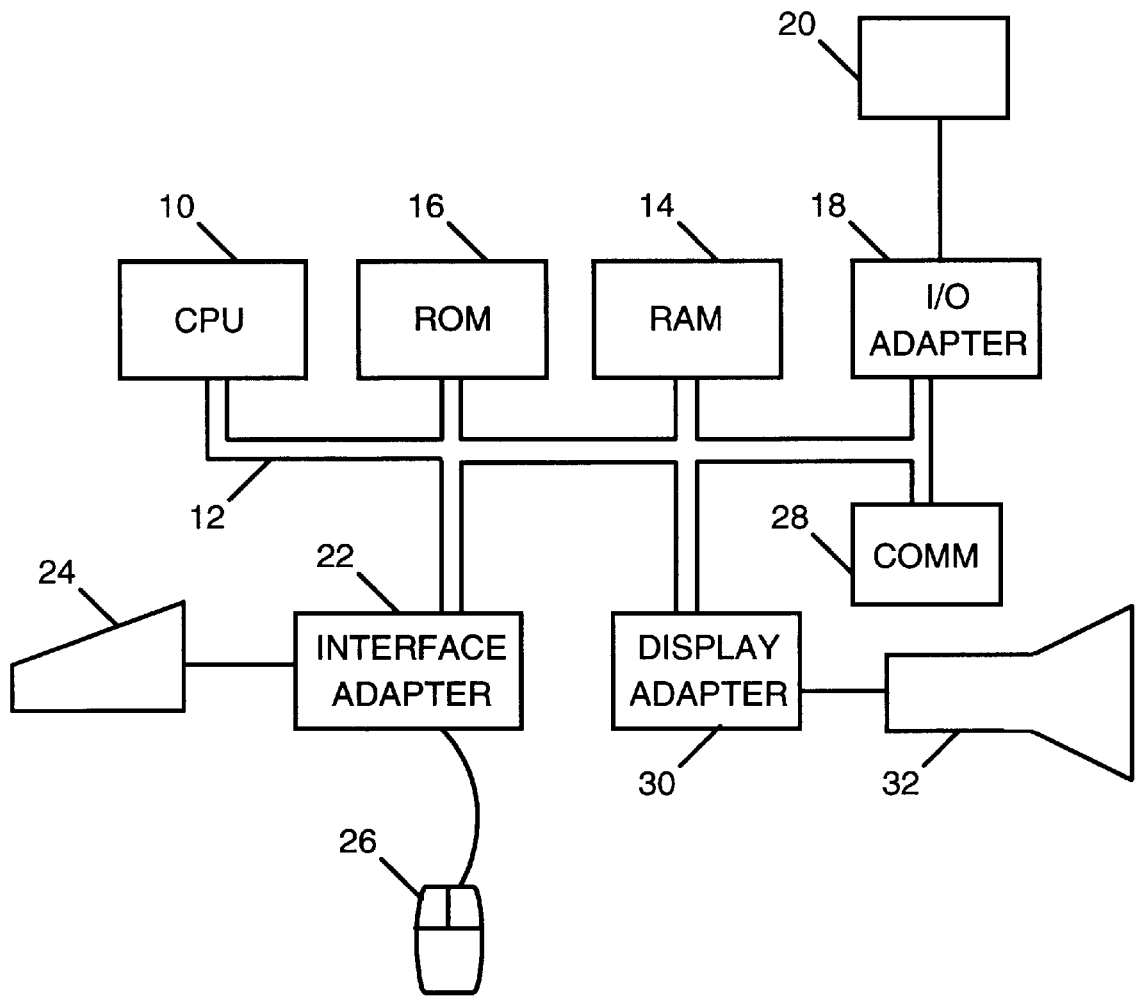
FIG. 1 is a block diagram of a system implementing a preferred embodiment of the invention.

The invention is preferably practiced in a system comprising a JAVA (registered trademark) interface operating on a normal standalone workstation. A representative hardware environment is depicted in FIG. 1 which illustrates a typical hardware configuration of a workstation in accordance with the subject invention as having a central processing unit 10, such as a conventional microprocessor, and a number of other units interconnected via a system bus 12. The workstation shown in FIG. 1 includes a Random Access Memory (RAM) 14 for storing data, a Read Only Memory (ROM) 16 for storing the programs used to control the operation of the system, an I/O adapter 18 for connecting peripheral devices such as a disk unit 20 to the bus, a user interface adapter 22 for connecting a keyboard 24, a mouse 26, a communication adapter 28 for connecting the workstation to a data processing network and a display adapter 30 for connecting the bus to a display screen 32. The workstation has resident thereon an operating system such as Windows 95/NT (registered trademark), Unix (registered trademark), AIX (registered trademark) and Solaris (registered trademark).

Figure 2:
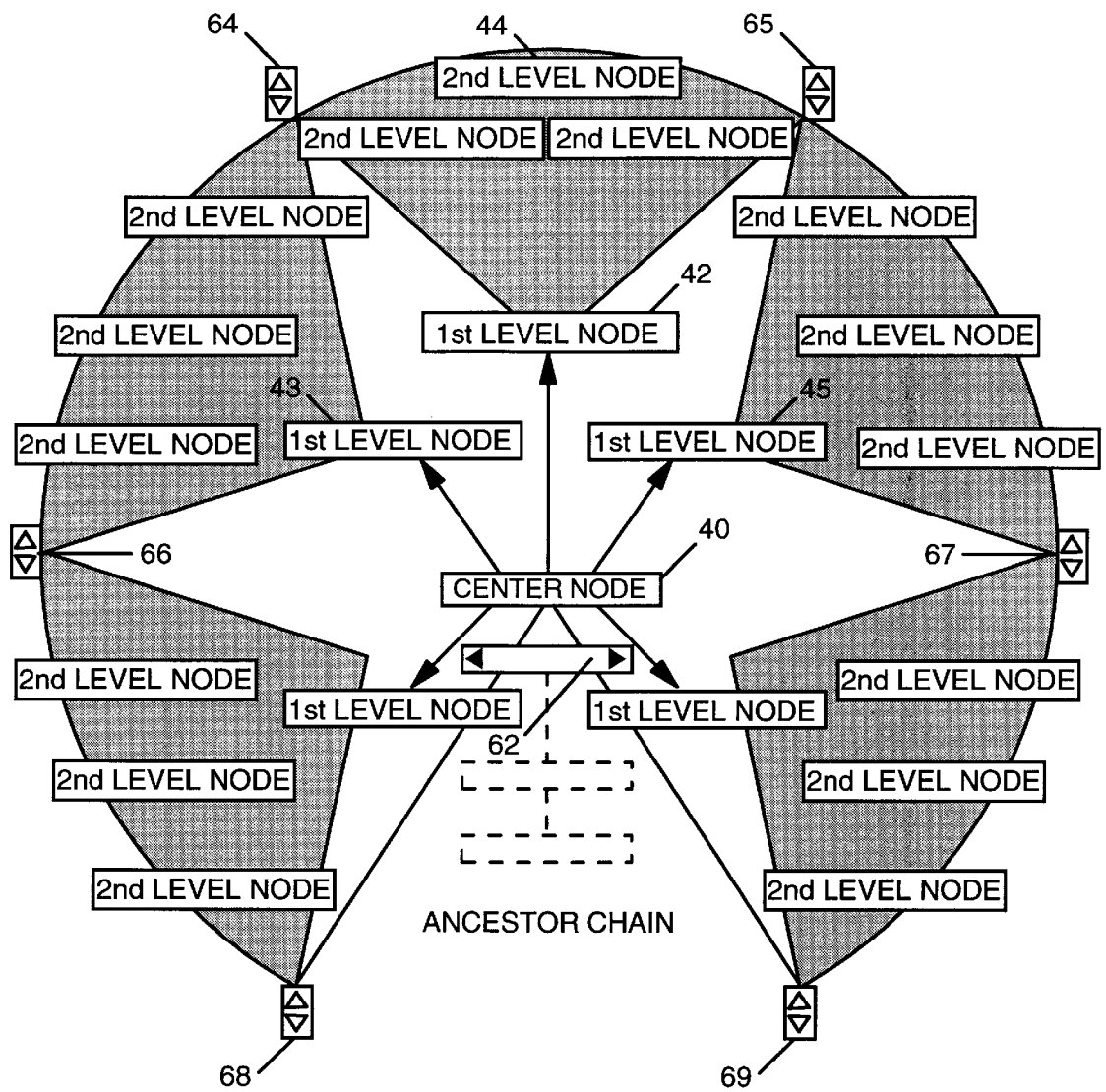
FIG. 2 represents a schematic view of the screen displaying a large tree structure in accordance with the preferred embodiment of the invention.

Basically, the view displayed on display screen 32 would be as illustrated in FIG. 2, and is centered around a given object, hereafter called the center node, which has been selected by using keyboard 24, mouse 26 or any other means. Center node 40 is displayed in the middle of the screen and is the center of an open ½ fan over an angle of about 270 degrees (as measured between points 68 and 69).

In the main fan centered around the center node, two levels of objects (or nodes) are spread out which are the first level descendants (or children) such as nodes 42 or 43 and the second level descendants (such as node 44) from the selected object which is the center node. Thus, the first level nodes are visualized in a fan centered around their parent object (center node), and each group of second level nodes is visualized in a fan centered around their parent object which is a first level node. It must be noted that the invention is not limited to 2 levels and that n levels (n>2) could be displayed on a larger screen or even with the same screen but with the drawback of having smaller characters for the information written for each object.

In the example illustrated in FIG. 2, there are 5 objects or nodes for the first level, and each first level node shows 3 second level nodes spread out in a fan centered around the associated first level node.

Each of the center nodes 40, the first level nodes and the second level nodes is associated with a memory area determining all the data necessary to display a window on the screen associated with this node such as window 40, 42 or 44. Amongst these data, a field A determines the aperture of the fan associated with each node.

Figure 3:
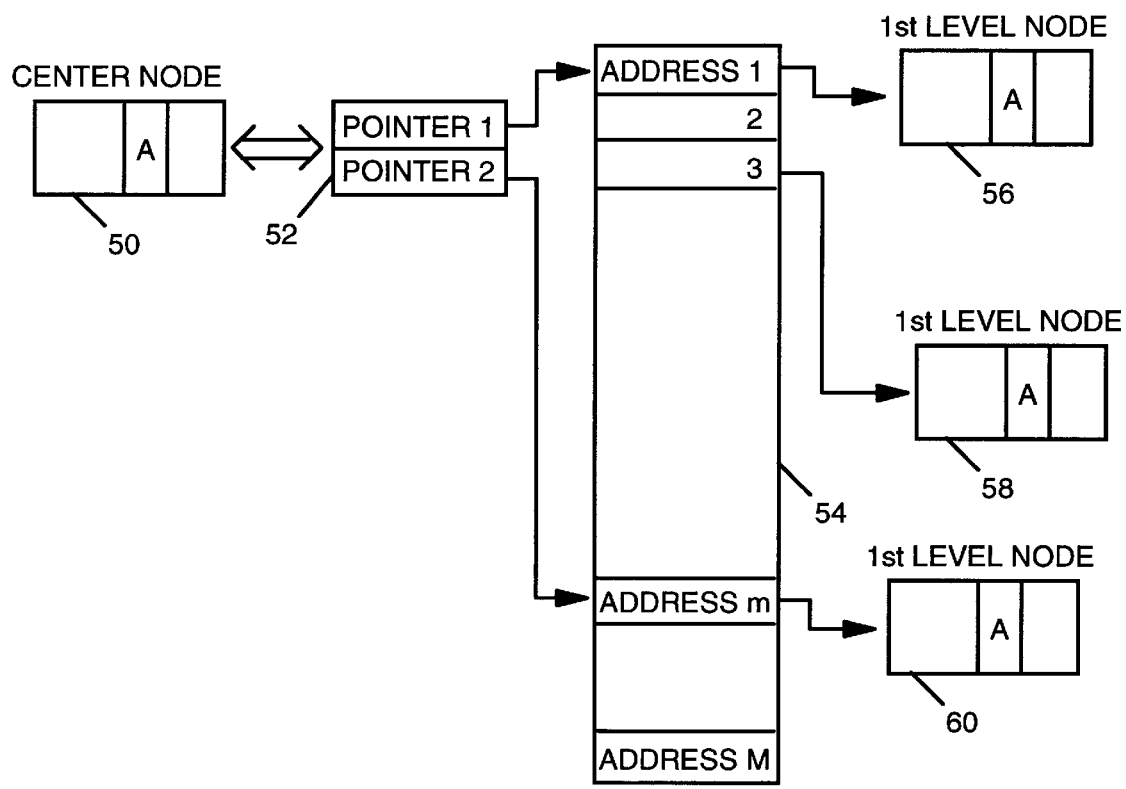
FIG. 3 is a block diagram showing the data components in memory which are associated with the center node in order to implement the invention.

In reference to FIG. 3, the memory area 50 containing the data determining the center node on the screen is associated with a zone in memory storing two pointers. These two pointers point respectively to address 1 and to address m of a buffer 54 which contains the sequence of the M addresses in memory of the areas associated with the M children of center node 40. All the addresses included in the buffer between address 1 and address m correspond to the m children which are spread out in the fan centered around the center node. Thus, in the example of FIG. 2, m=5. Each address between address 1 and address m points to the memory area containing the data necessary to determine the associated node on the screen. As for memory area 50 associated with the center node, each memory area 56, 58 or 60 respectively addressed by address 1, address 3 or address m, includes a field determining the aperture of the fan associated with each node.

A structure identical to the structure shown in FIG. 3 is also associated with each first level node, the memory areas addressed by buffer addresses corresponding in that case to the data necessary to display the windows on the screen relative to the second level nodes (such as node 44). Note that, in the example shown in FIG. 2, m=3 since only 3 second level nodes are displayed in the fan centered around each first level node.

If the user wishes to see one node which is not currently in the visible portion of the fan associated with center node 40, he can use the small scrollbar 62 attached to the node and which appears automatically when the mouse flies over the node. By clicking on the edges of the scrollbar, he can have the other children scrolling with the fan. Note that the same mechanism can be carried out for each first level node by moving the mouse to this node so that the associated scrollbar appears under the window displaying the node. Thus, there is no limitation on the number M of the direct children that can be accessed for each node, the only restriction being that they cannot be shown all at the same time if too many of them exist.

In addition, the user can dynamically close some of the second level fans so as to give more room to adjacent fans and thus display more second level nodes for other first level nodes. For this, there are at each edge of the fan, fan control buttons that enable to close and open the fan via simple mouse dragging by the user. As a fan control button is at the left edge of a fan and at the right edge of the adjacent fan, closing one fan automatically opens the adjacent one. Thus, in reference to FIG. 1, fan control button 64 is located at the left edge of the fan centered around first level node 42 and at the right edge of the fan centered around first level node 43. When button 64 is moved to the right (clockwise), the fan centered around node 42 gets smaller whereas the fan centered around node 43 gets bigger. When button 64 is moved to the left (counterclockwise), the fan centered around node 42 gets bigger whereas the fan centered around node 43 gets smaller.

Figure 4:
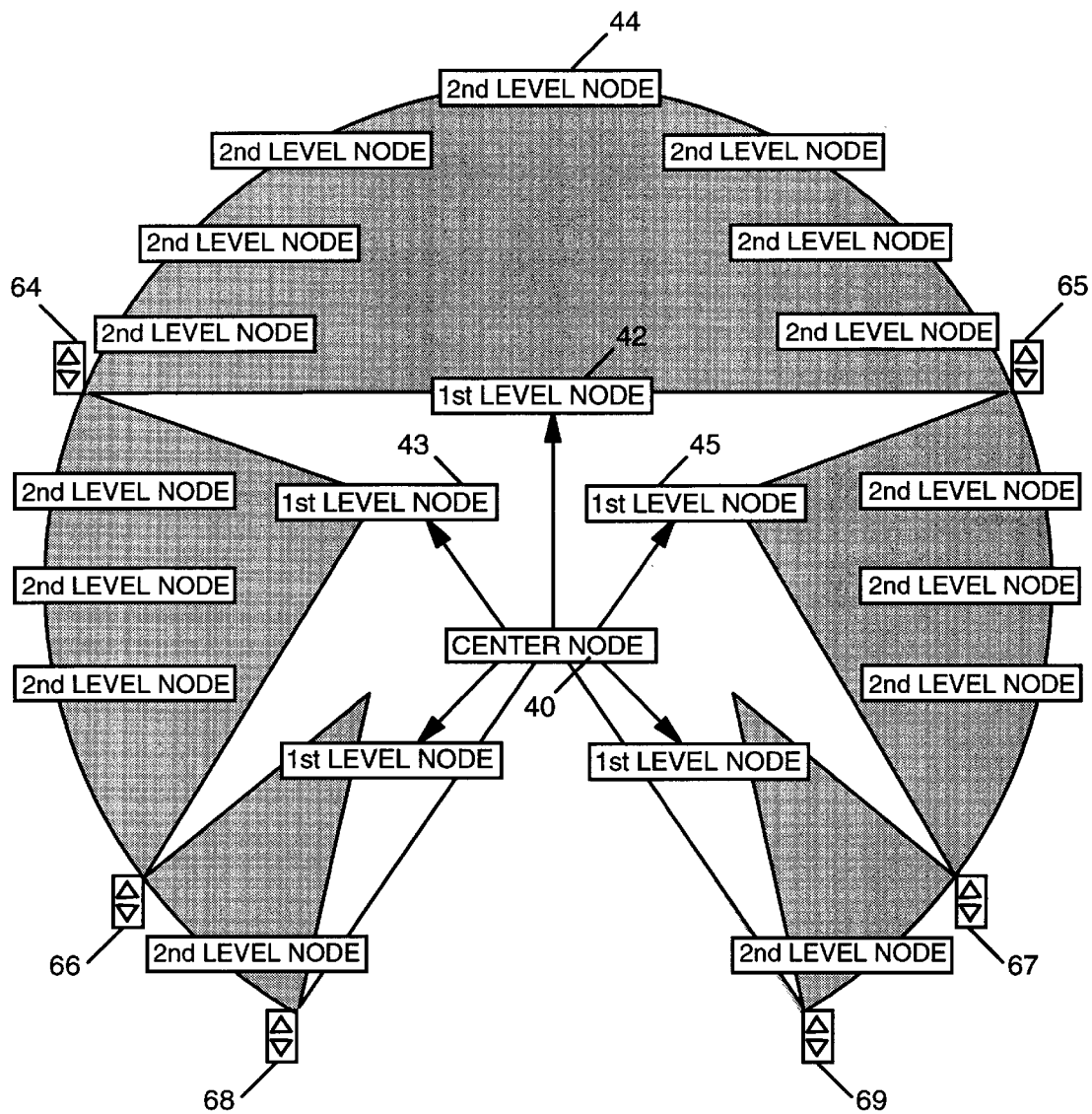
FIG. 4 represents a schematic view of the screen displaying a the same structure as FIG. 2 but wherein the apertures of the fans have been modified.

FIG. 4 shows the screen when the fan centered around first level node 42 has been opened by moving fan control buttons 64 and 65 so that 7 second level nodes are displayed in the fan whereas only 3 nodes were displayed before moving buttons 64 and 65 (see FIG. 2). In the same way, buttons 66 and 67 have been moved so that the aperture of the fans centered around nodes 43 and 45 have not been modified but only translated whereas the apertures of the fans located at the end of the main fan have been shrunk so that only one second level node is displayed in each of these fans.

Note that moving fan control button 68 which is at the left edge of the left end of the main fan, causes only one fan centered around the end first level node to be opened or closed. Such a mechanism can also cause the main fan around the center node to be opened if the aperture has not reached its maximum value or to be closed. The same mechanism is used for fan control button 69 at the right edge of the main fan.

Figure 5:
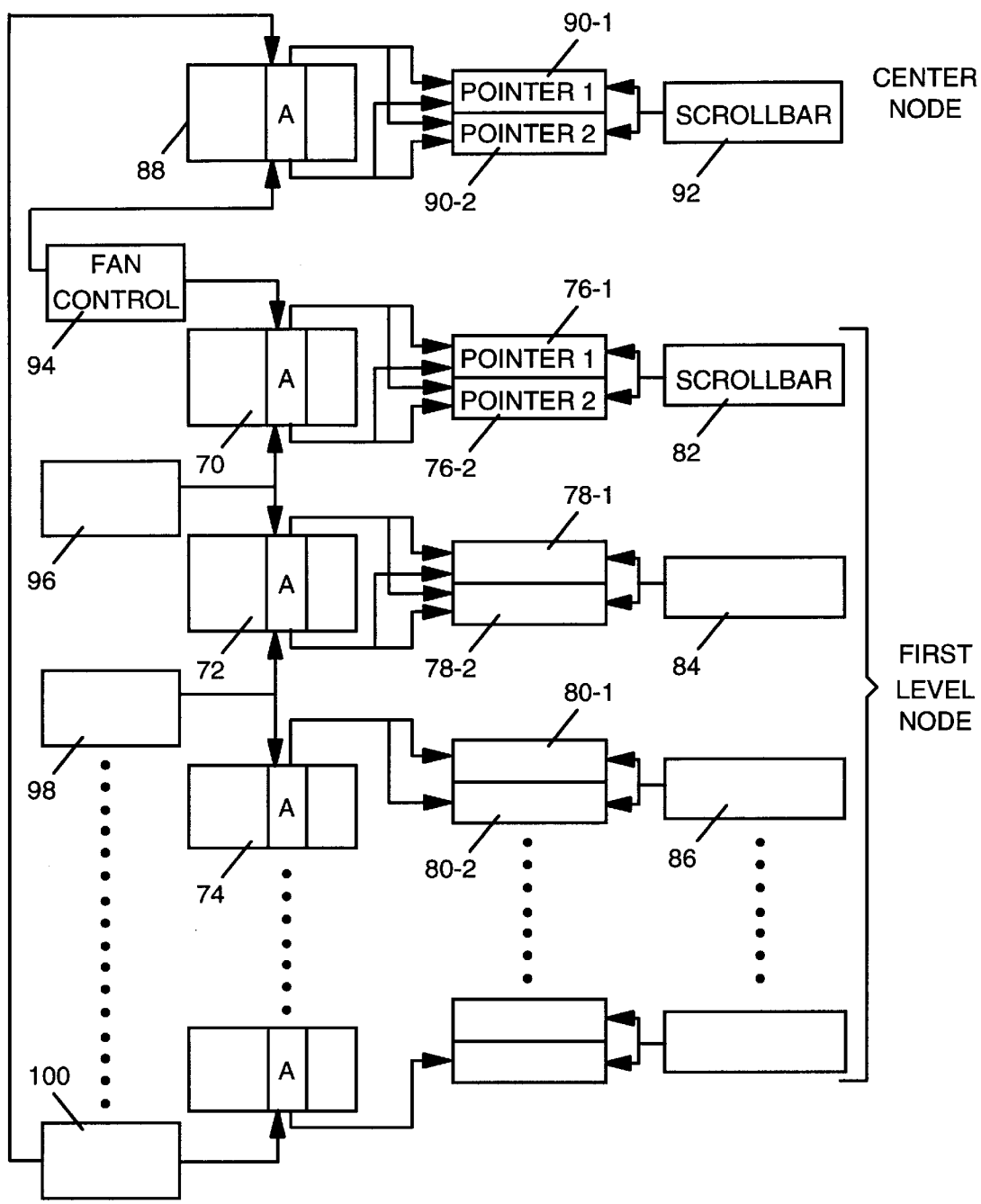
FIG. 5 is a block diagram showing the data components in memory which enable the fans displayed on the screen to be scrolled, enlarged or shrunk according to the features of the invention.

The mechanism implemented for handling the scrollbars and the fan control buttons can be well understood in reference to FIG. 5. As illustrated, each first level node is represented by a memory area such as 70, 72 or 74 including each an aperture field A. For each memory area, field A controls the value of the two associated pointers pointing to the addresses of memory areas corresponding to the children of the node. Thus, field A of memory area 70 controls pointers 76-1 and 76-2, field A of memory area 72 controls pointers 78-1 and 78-2 and field A of memory area 74 controls pointers 80-1 and 80-2. The pointers are also controlled by scrollbars associated with each node. Thus, pointers 76-1 and 76-2 are controlled by scrollbar 82, pointers 78-1 and 78-2 are controlled by scrollbar 84 and pointers 80-1 and 80-2 are controlled by scrollbar 86.

When the user clicks on the edges of a scrollbar corresponding to a node, he causes the value of both pointer 1 and pointer 2 to be incremented by one (or decremented by one). Assuming that the values of pointers 1 and 2 point to address 1 and address m, clicking on one edge of the scrollbar causes the pointers to point to address 2 and address m+1. This results in scrolling the descendants of the node within the fan each time the user clicks the scrollbar. It must be noted that this mechanism does not change the value of field A and therefore of the fan aperture.

Note that such a mechanism is also used for the center node defined on the screen by memory area 88 associated to pointers 90-1 and 90-2. In the same way, clicking on the edge of scrollbar 92 causes pointers 90-1 and 90-2 to be simultaneously incremented by one (or decremented by one) and the first level nodes to scroll within the fan centered around the center node.

Always in reference to FIG. 5, when the user moves one of the fan control buttons such as buttons corresponding to fan controls 94, 96, 98 or 100, this action modifies the value of aperture A in two memory areas. For example, moving fan control button 96 causes the A value of memory area 70 to increase while it causes the A value of memory area 72 to decrease, resulting in making one fan bigger and the adjacent fan smaller. At the same time, the modification of A in a memory area corresponding to a node also modifies one of the two pointers associated with this node. Thus, decreasing the A value of memory area 70 by moving button 64 on the screen (which modifies fan control 96) causes pointer 76-1 to be decremented, resulting in showing less second level nodes children of first level node 42, while the same action increases the A value of memory area 72 which causes pointer 78-2 to be incremented, resulting in showing more second level nodes children of first level node 43. Conversely, increasing the A value of memory area 70 by moving fan control button 64 causes pointer 76-2 to be incremented, resulting in showing more second level nodes children of first level node 42, while the same action decreases the A value of memory area 72 which causes pointer 78-2 to be decremented, resulting in showing less second level nodes children of first level node 43.

As far as center node 40 is concerned, the value of aperture A could be modified only by moving one of the end buttons 68 or 69 corresponding respectively to fan controls 94 or 100. However, the mechanism is the same as the one described above except that the main fan gets bigger when the first level node fan gets bigger and reciprocally. For example decreasing the A value of memory area 88 (associated with the center node) by moving button 68 (which modifies fan control 94) could causes pointer 90-1 to be decreased (such a feature can be implemented or not) resulting in showing less first level nodes on the screen, while the same action decreases the A value of memory area 70 which causes pointer 76-1 to be decremented, resulting in showing less second level node children of the first level node.

Note that there remains an area which is not exploited behind the center node (see FIG. 2). Such an area can have an aperture between 50 and 100 which depends upon the possibility of increasing the main fan centered around the center node. This area can be reserved for displaying the ancestor chain if any on a straight vertical axis behind the center node as shown in dashed line in FIG. 2.

Finally, the fan view can be shown in association with a regular tree-control view (for example in the left side of the screen) so as to select on which tree to focus. The tree-control enables the user to select the root of the fan view. When the user selects another node, either from the tree-control view or from the fan view itself, the current fan view is closed, using a fan-like animation that closes the small fans one at a time, and a new fan view is opened centered around the newly selected node.

We claim:

1. System for the visualization of a large tree structure comprising a processing unit (10), a storage (14), a display screen (32) and a mouse (26) for positioning a cursor on said screen, in which the selection of a center object (40) amongst the objects of said large tree structure under the control of said processing unit enables n levels of descendants from said center object to be visualized on said screen together with said center object said system being characterized in that it comprises visualization control means in said memory enabling the objects of a given level corresponding to the children of a parent object of the immediate higher level to be visualized in a fan centered around said parent object, a scrollbar (62) associated with said parent object enabling all the children thereof to be scrolled in said fan.

2. System according to claim 1, comprising fan control means (94, 96, 98, 100) in said memory (14) enabling the aperture of said fan centered around said parent object to be modified so that a variable number of children thereof can be visualized in said fan.

3. System according to claim 2, wherein said fan control means (94, 96, 98, 100) are associated with a plurality of fan control buttons (64 to 69) on the screen (32) which are controlled by dragging said mouse (26) to modify the aperture of said fan centered around said parent object.

4. System according to claim 3, wherein at least one of said fan control buttons (64, 65, 66 or 67) is located at the junction between two fans centered around two parent objects of the same level and can be moved on the screen (32) by mouse dragging so that one of said two fans gets bigger while the other one gets smaller when said button is moved.

5. System according to claim 3, wherein at least one of said control buttons (68 or 69) is located at the end of the main fan centered around said center object and can be moved on the screen (32) by mouse dragging so that said main fan and the end fan centered around the parent object which is at the end of the main fan are both enlarged or shrunk.

6. System according to any one of claims 1 to 5, in which said visualization control means comprise for said center object and for each object of at least the n-1 first levels of descendants considered as a parent object:

a buffer (54) for storing the addresses of the M children of said parent object, a location defining the aperture angle of a fan within a subset of m children is displayed (m≦M), the addresses of these ones being consecutive in said buffer, and a first and a second pointers for pointing to respective addresses in said buffer of the first and last children of said subset, the value of said pointers being determined by the value of said aperture angle.

7. System according to claim 6 in which said scrollbar (62) associated with each parent object is displayed adjacent to said parent object when said mouse (26) flies over said parent object and can be controlled by said mouse so that the value of both first and second pointers are simultaneously incremented or decremented whereby the m children corresponding to the m addresses between the addresses defined by said pointers are scrolled on said screen (32).

8. System according to claim 7, in which moving one of said fan control buttons (96, 98) located at the junction between two fans centered around two parent objects of the same level causes the aperture angle of the first one of said two fans to be incremented and the aperture angle of the other fan to be decremented, whereby the first fan is enlarged while the other fan is shrunk.

9. System according to claim 4, in which moving one of said fan control buttons (96, 98) located at the junction between two fans centered around two parent objects of the same level causes the aperture angle of the first one of said two fans to be incremented and the aperture angle of the other fan to be decremented, whereby the first fan is enlarged while the other fan is shrunk.

10. System according to claim 7, in which moving one of said fan control buttons (94, 100) located at the end of the main fan centered around said center object causes the aperture angles of said main fan and of the end fan centered around the parent object which is at the end of the main fan to be both incremented or decremented whereby said main fan and said end fan are both enlarged or shrunk.

11. System according to claim 5, in which moving one of said fan control buttons (94, 100) located at the end of the main fan centered around said center object causes the aperture angles of said main fan and of the end fan centered around the parent object which is at the end of the main fan to be both incremented or decremented whereby said main fan and said end fan are both enlarged or shrunk.

12. System according to claim 6 further comprising means for displaying the chain of ancestors of said center object behind said center object on said screen (32).

13. System according to claim 6, in which said number n of levels is equal to 2.

* * * * *